(12) United States Patent
Hoga et al.

(10) Patent No.: US 12,326,352 B2
(45) Date of Patent: Jun. 10, 2025

(54) ELECTRONIC DEVICE

(71) Applicant: BROTHER KOGYO KABUSHIKI KAISHA, Nagoya (JP)

(72) Inventors: Masahiro Hoga, Ogaki (JP); Yuta Arakawa, Nagoya (JP); Haruhisa Shirai, Kasugai (JP); Nobumasa Tanaka, Nagoya (JP); Shoji Sato, Okazaki (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 125 days.

(21) Appl. No.: 18/318,256

(22) Filed: May 16, 2023

(65) Prior Publication Data

US 2023/0375374 A1 Nov. 23, 2023

(30) Foreign Application Priority Data

May 17, 2022 (JP) .................................. 2022-080946

(51) Int. Cl.
*G01D 5/347* (2006.01)
*G01D 5/244* (2006.01)
*G01D 5/245* (2006.01)

(52) U.S. Cl.
CPC ....... *G01D 5/3473* (2013.01); *G01D 5/24476* (2013.01); *G01D 5/2451* (2013.01)

(58) Field of Classification Search
CPC ............. G01D 5/3473; G01D 5/24476; G01D 5/2451; B41J 11/008
See application file for complete search history.

(56) References Cited

U.S. PATENT DOCUMENTS

| | | | | |
|---|---|---|---|---|
| 5,116,149 A | * | 5/1992 | Yamasaki | B41J 11/42 400/279 |
| 2010/0007689 A1 | * | 1/2010 | Hagiwara | B41J 29/38 347/19 |
| 2011/0147572 A1 | * | 6/2011 | Nakamura | G01D 5/2448 250/231.16 |
| 2017/0012568 A1 | * | 1/2017 | Kiguchi | H02P 29/0241 |

FOREIGN PATENT DOCUMENTS

| | | |
|---|---|---|
| JP | H04-069260 A | 3/1992 |
| JP | H06-122242 A | 5/1994 |
| JP | 2017-177700 A | 10/2017 |

\* cited by examiner

*Primary Examiner* — Dominic E Hawkins
(74) *Attorney, Agent, or Firm* — Scully, Scott, Murphy & Presser, PC

(57) ABSTRACT

An electronic device includes a motor, a moving body on which a processing part is mounted, a rotary encoder, a memory; and a controller. The controller is configured to execute a detection process of detecting a position of the moving body based on an encoder signal, a control process including a first control of controlling movement of the moving body by controlling the motor and a second control of controlling a processing operation by the processing part in a constant speed movement section of the moving body, a determination process of determining a detection error of the position of the moving body generated in an acceleration section of the moving body based on information stored in the memory, and a correction process of correcting at least one of the first control and the second control.

14 Claims, 10 Drawing Sheets

ND DEVICE

REFERENCE TO RELATED APPLICATIONS

This application claims priority from Japanese Patent Application No. 2022-080946 filed on May 17, 2022. The entire content of the priority application is incorporated herein by reference.

BACKGROUND ART

A system, which controls a motor based on an encoder signal which is an input signal from an encoder, is known. For example, an ink jet printer controls movement of a carriage, on which an ink jet head is mounted, by controlling the motor based on the input signal from a linear encoder.

A machine tool such as a cutting machine that controls the movement of the carriage, on which a machine head is mounted, based on the encoder signal is also known. A technique of switching control of a drive part in consideration of a stain of the linear encoder is also known.

DESCRIPTION

The present inventors consider that a rotary encoder is used instead of the linear encoder in conveyance control of the carriage in the ink jet printer. In an exemplary rotary encoder, an encoder signal is generated by reading a rotating scale using a sensor.

However, in the rotary encoder, the scale rotates a plurality of times while the carriage moves in one way to a return point in a main scanning direction. Therefore, when there is a stain on the scale, the sensor reads the stains on the scale many times until the carriage moves to the return point and stops.

The carriage is controlled, for example, to accelerate from a stop point, move at a constant speed and at a predetermined speed, then decelerate, and stop at a return point. In a constant speed movement section, since the speed of the carriage is stable, the stain of the scale can be determined relatively easily, and an influence of the stain can be removed.

On the other hand, in a non-constant speed movement section, it is difficult to determine whether a change in the encoder signal received from the rotary encoder is caused by a stain. Therefore, it is difficult to remove an influence of the stain in the non-constant speed movement section in the related art. The problem can similarly occur not only in an ink jet printer but also in a device that performs conveyance control of a carriage based on an encoder signal from a rotary encoder.

Therefore, according to one aspect of the present disclosure, it is desirable to provide a technique capable of preventing an influence of a stain of a rotary encoder and improving control accuracy in an electronic device that controls a moving body such as a motor or a head using the rotary encoder.

An electronic device according to one aspect of the present disclosure includes a motor, a moving body, a rotary encoder, a memory, and a controller. The moving body is mounted with a processing part for processing an object, and is configured to move in conjunction with rotation of the motor by an action of a force from the motor.

The rotary encoder includes a scale and a sensor, and is configured to output, as an encoder signal, a read signal of the scale read by the sensor when the scale rotates relative to the sensor in conjunction with the rotation of the motor.

The memory is configured to store information capable of identifying a rotation angle of the scale when the sensor cannot normally read the scale. The controller is configured to control the motor and the processing part based on the encoder signal received from the rotary encoder.

The controller is configured to execute a detection process, a control process, a determination process, and a correction process. The detection process includes detecting a position of the moving body based on the encoder signal. The control process is a process based on the position of the moving body detected by the detection process, and includes a first control of controlling movement of the moving body by controlling the motor, and a second control of controlling a processing operation on the object by the processing part in a constant speed movement section of the moving body.

The determination process includes determining a detection error of the position detected by the detection process generated in an acceleration section of the moving body temporally before the constant speed movement section based on the information stored in the memory. The correction process includes correcting at least one of the first control and the second control based on the detection error determined in the determination process.

According to this electronic device, in the electronic device that controls the motor and the processing part using the rotary encoder, the influence of the detection error of the position generated in the acceleration section due to a stain of the rotary encoder can be prevented, the control of the motor can be executed with high accuracy, and/or the control of the processing part can be executed with high accuracy, and the control accuracy can be improved.

Hereinafter, exemplary embodiments of the present disclosure will be described with reference to the drawings. An image forming device 1 according to the present embodiment is a serial printer that forms an image on a sheet by reciprocating, in a main scanning direction, a recording head 31 mounted on a carriage 41. The recording head 31 corresponds to a processing part, and forming of an image on a sheet corresponds to processing of the sheet. The image forming device 1 is configured as an ink jet printer that forms an image on a sheet by an ink jet method.

Figure 1:
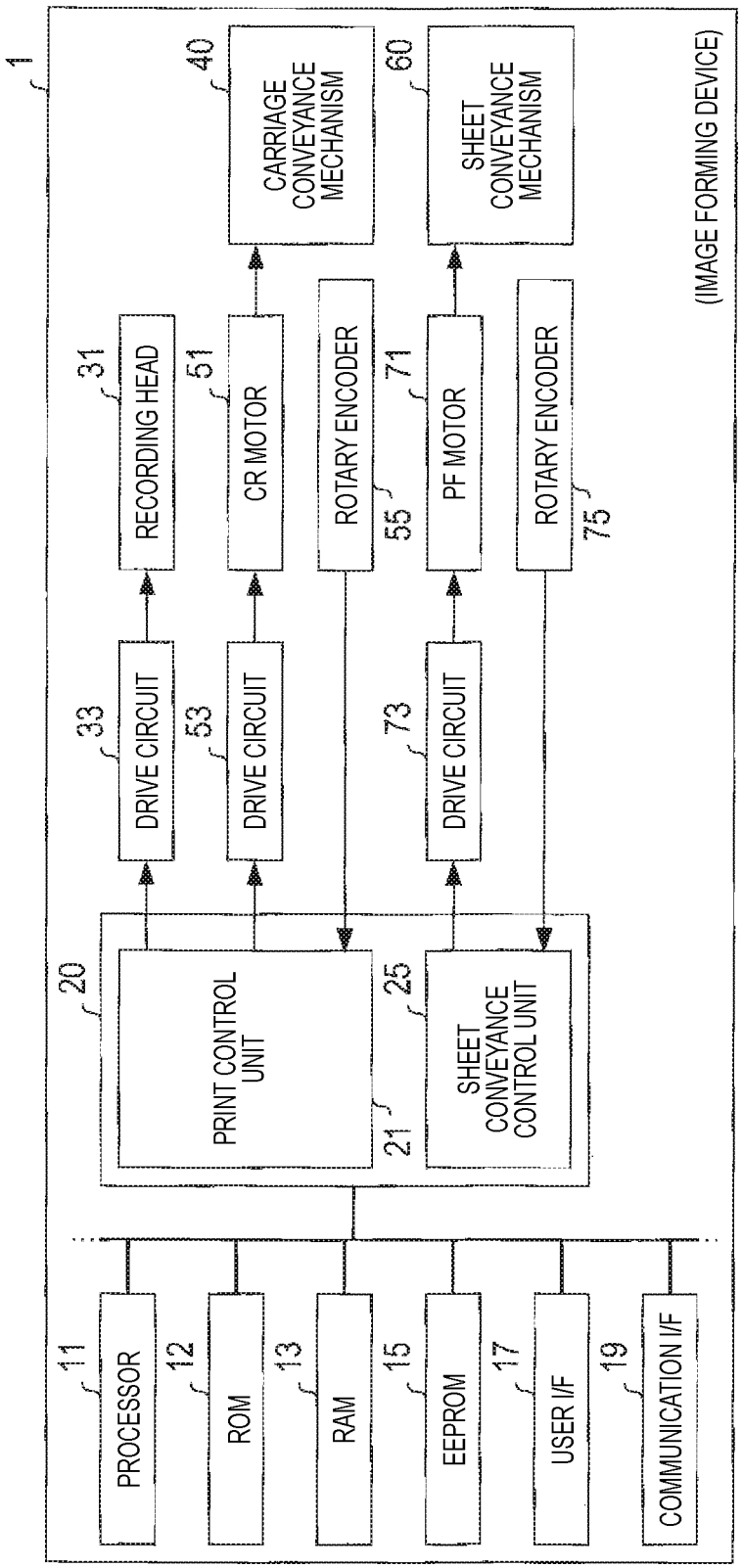
FIG. 1 is a block diagram showing a configuration of an image forming device.

As shown in FIG. 1, the image forming device 1 includes a processor 11, a ROM 12, a RAM 13, an EEPROM 15, a user interface 17, a communication interface 19, and an application specific integrated circuit (ASIC) 20.

The processor 11 performs overall control of the image forming device 1 by executing a process according to a computer program recorded in the ROM 12. The ROM 12 stores the computer program executed by the processor 11.

The RAM 13 is used as a working memory when the processor 11 executes the process. The EEPROM 15 stores setting information as an electrically rewritable nonvolatile memory.

The user interface 17 includes a display for displaying information to a user who uses the image forming device 1, and an input device for receiving an operation from the user to the image forming device 1. The communication interface 19 is an interface that enables communication between the image forming device 1 and a personal computer (not shown), and is configured to receive print target data from the personal computer.

When receiving the print target data from the personal computer through the communication interface 19, the processor 11, through the ASIC 20, controls conveyance of the sheet, controls movement of the carriage 41, and controls an ejection operation of ink droplets ejected by the recording head 31 as a processing operation on the sheet. Accordingly, an image based on the print target data is formed on the sheet.

Although not shown, the ASIC 20 may include a processor, a memory, and a dedicated circuit necessary for control. According to the image forming device 1 according to the present embodiment, the processor 11 and the ASIC 20 cooperate with each other to function as one controller, and perform control necessary for image formation on the sheet.

The ASIC 20 includes a print control unit 21 and a sheet conveyance control unit 25. The print control unit 21 controls the movement of the carriage 41 and controls the ejection operation of ink droplets ejected by the recording head 31. The sheet conveyance control unit 25 controls the conveyance of the sheet. Functions of the print control unit 21 and the sheet conveyance control unit 25 are implemented by at least one of the processor and the dedicated circuit in the ASIC 20.

The image forming device 1 further includes a drive circuit 33 for driving the recording head 31. The image forming device 1 further includes a carriage conveyance mechanism 40, a CR motor 51, a drive circuit 53, a rotary encoder 55, a sheet conveyance mechanism 60, a PF motor 71, a drive circuit 73, and a rotary encoder 75.

The drive circuit 33 drives the recording head 31 according to a control signal from the print control unit 21, thereby driving the recording head 31 such that the recording head 31 executes the ejection operation of ink droplets according to the control signal.

Figure 2:
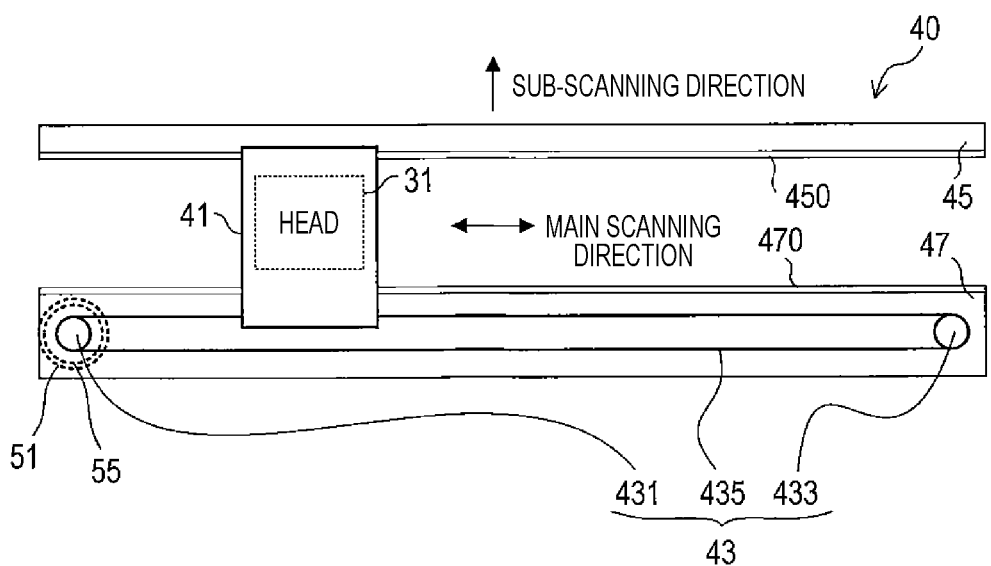
FIG. 2 is a plan view showing a schematic configuration of a carriage conveyance mechanism.

As shown in FIG. 2, the carriage conveyance mechanism 40 includes a belt mechanism 43 and guide rails 450 and 470 in addition to the carriage 41. The belt mechanism 43 rotates by receiving an action of a force from the CR motor 51. With this rotation, the carriage 41 on which the recording head 31 is mounted moves in the main scanning direction in conjunction with the rotation of the CR motor 51.

The belt mechanism 43 includes a drive pulley 431 and a driven pulley 433 disposed in a line in the main scanning direction, and a belt 435 wound between the drive pulley 431 and the driven pulley 433. In the belt mechanism 43, the drive pulley 431 rotates by receiving a power from the CR motor 51, and the belt 435 and the driven pulley 433 are driven and rotated by the rotation of the drive pulley 431. The carriage 41 is fixed to the belt 435 that rotates in this way.

The guide rail 450 extends along the main scanning direction, and includes a member 45 having an L-shaped cross section perpendicular to the main scanning direction.

The guide rail 470 is provided parallel to the guide rail 450 at a position separated from the guide rail 450 in a sub-scanning direction. A member 47 constituting the guide rail 470 is a member having an L-shaped cross section perpendicular to the main scanning direction, and is provided upstream of the member 45 in the sub-scanning direction.

The belt mechanism 43 is disposed in a region upstream of a portion constituting the guide rail 470 of the member 47 in the sub-scanning direction. The carriage 41 includes grooves (not shown) corresponding to shapes of the guide rails 450 and 470 in a lower portion of the carriage 41 in the main scanning direction.

The carriage 41 is placed on the guide rails 450 and 470 such that the guide rails 450 and 470 are disposed in the grooves. With this placement, when the CR motor 51 rotates, the carriage 41 is guided by the guide rails 450 and 470 and moves in the main scanning direction in conjunction with the rotation of the belt 435. The recording head 31 is conveyed in the main scanning direction according to the movement of the carriage 41.

The CR motor 51 is a DC motor for driving the carriage conveyance mechanism 40, and rotates based on a power supplied from the drive circuit 53 to rotate the drive pulley 431. The drive circuit 53 drives the CR motor 51 to apply the corresponding drive power to the CR motor 51 according to the control signal for the CR motor 51 received from the print control unit 21. The CR motor 51 is, for example, PWM-driven.

The rotary encoder 55 is provided on a rotation shaft of the CR motor 51 or a rotation system that rotates in conjunction with the CR motor 51. The rotary encoder 55 used in the present embodiment is an incremental rotary encoder.

Figure 3:
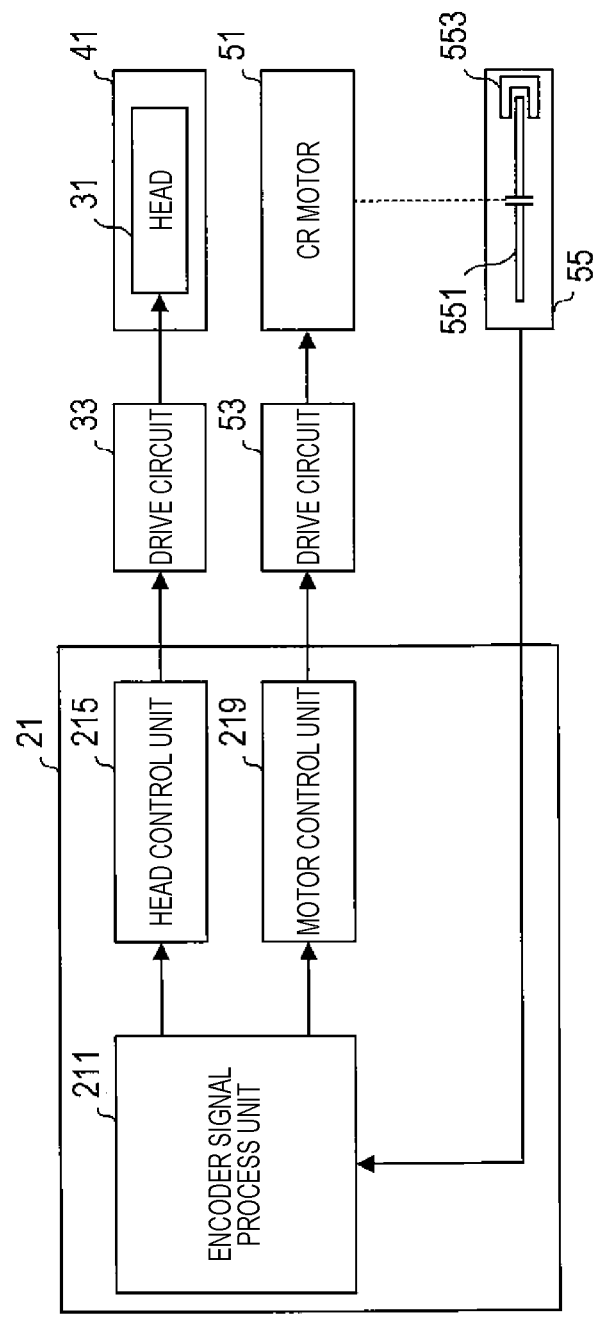
FIG. 3 is a block diagram showing a configuration of a print control unit in an ASIC.

As shown in FIG. 3, the rotary encoder 55 includes an encoder scale 551 and a sensor 553. The encoder scale 551 is a rotation disk having scales marked at predetermined angular intervals. The scales are provided in the encoder scale 551 as, for example, slits through which light can be transmitted from the front side to the back side of the encoder scale 551.

The sensor 553 is configured to read the scales of the encoder scale 551. The sensor 553 may be an optical sensor. For example, the sensor 553 may be implemented by a combination of a light emitting element and a light receiving element sandwiching the encoder scale 551 from both sides.

Light emitted from the light emitting element propagates from the front side to the back side of the encoder scale 551 through the slits as the scales, and is received by the light receiving element, and therefore the scales can be read. According to another example, since the light emitted from the light emitting element is reflected by the scales and received by the light receiving element, the scales of the encoder scale 551 can be read by the sensor 553.

In the present embodiment, the encoder scale 551 rotates in conjunction with the CR motor 51 relative to the stationary sensor 553, and therefore the encoder scale 551 rotates relative to the sensor 553. However, the rotary encoder 55 may be configured such that the sensor 553 rotates in conjunction with the CR motor 51 relative to the stationary encoder scale 551, and therefore the encoder scale 551 rotates relative to the sensor 553.

As the encoder scale 551 rotates in conjunction with the rotation of the CR motor 51, a position of the encoder scale 551 relative to the sensor 553, specifically, a rotation angle of the encoder scale 551 changes. Accordingly, a light receiving state of the light receiving element of the light emitted from the light emitting element changes. Due to the change in the light receiving state, a pulse signal is output from the sensor 553.

The pulse signal is a read signal of the encoder scale 551 read by the sensor 553 when the encoder scale 551 rotates relative to the sensor 553 in conjunction with the rotation of the CR motor 51. Hereinafter, the pulse signal is referred to as an encoder signal.

According to the present embodiment, the CR motor 51 and the drive pulley 431 are mechanically coupled to each other. The drive pulley 431 rotates according to the rotation of the CR motor 51, and the carriage 41 moves. The rotary encoder 55 is used to detect a position X and a speed V in the main scanning direction of the carriage 41 moving in conjunction with the rotation of the CR motor 51.

That is, the print control unit 21 detects the position X and the speed V of the carriage 41 based on the encoder signal received from the rotary encoder 55, and based on information of the detected position X and speed V, controls the movement of the carriage 41 in the main scanning direction through the control of the CR motor 51 as first control, and controls the ejection operation of the ink droplets ejected from the recording head 31 as second control.

The sheet conveyance mechanism 60 is driven by the PF motor 71 to convey the sheet in the sub-scanning direction perpendicular to the main scanning direction. Specifically, the sheet conveyance mechanism 60 conveys the sheet supplied from a tray in the sub-scanning direction by rotation of a roller (not shown), and sends the sheet to an ejection position of the ink droplets ejected from the recording head 31.

The PF motor 71 is a DC motor for driving the sheet conveyance mechanism 60, and rotates based on a power supplied from the drive circuit 73. The drive circuit 73 drives the PF motor 71 so as to apply the corresponding drive power to the PF motor 71 according to a control signal for the PF motor 71 received from the sheet conveyance control unit 25 of the ASIC 20.

The rotary encoder 75 is provided on a rotation shaft of the PF motor 71 or a rotation system that rotates in conjunction with the PF motor 71. The rotary encoder 75 inputs, to the sheet conveyance control unit 25 of the ASIC 20, a pulse signal corresponding to the rotation of the PF motor 71 as an encoder signal.

The sheet conveyance control unit 25 detects a position of the sheet based on the encoder signal received from the rotary encoder 75, and controls a conveyance operation of the sheet conveyed by the sheet conveyance mechanism 60 based on information of the detected position.

That is, when the print target data is received through the communication interface 19, the processor 11 causes the recording head 31 to execute the ejection operation of the ink droplets for forming an image based on the print target data on the sheet through the print control unit 21, and causes the carriage 41 to move in the main scanning direction.

The processor 11 further sends the sheet in the sub-scanning direction by a predetermined amount through the sheet conveyance control unit 25 every time the carriage 41 reaches a return point in the main scanning direction. Accordingly, the processor 11 forms an image on the sheet stepwise through the print control unit 21 and the sheet conveyance control unit 25, and forms an image based on the print target data.

Next, the configuration of the print control unit 21 will be described with reference to FIG. 3. As shown in FIG. 3, the print control unit 21 includes an encoder signal process unit 211, a head control unit 215, and a motor control unit 219.

The encoder signal process unit 211 detects the position X of the carriage 41 and the speed V of the carriage 41 based on the encoder signal received from the rotary encoder 55.

The detection of the position X of the carriage 41 is performed by incrementing a count value related to a position by 1 or decrementing the count value related to the position by 1 every time a rising edge of the encoder signal which is the pulse signal is detected. The encoder signal includes an A-phase signal and a B-phase signal, and a rotation direction of the CR motor 51 is detected based on a phase difference between the A-phase signal and the B-phase signal.

When the CR motor 51 rotates in a forward direction, and accordingly, the carriage 41 moves in the forward direction, the count value is incremented. When the CR motor 51 rotates in a reverse direction, and accordingly, the carriage 41 moves in the reverse direction, the count value is decremented. The count value is treated as information indicating the position X of the carriage 41 in the main scanning direction. The forward direction of the position X corresponds to a direction in which the carriage 41 moves in the forward direction. In addition, by detecting a time interval of the rising edge of the encoder signal, the speed V of the carriage 41 is detected as an inverse number of the time interval.

Based on the position X of the carriage 41 detected by the encoder signal process unit 211 and/or the encoder signal, the head control unit 215 generates a control signal for causing the recording head 31 to execute the ejection operation of the ink droplets such that a target image is formed on the sheet, and inputs the generated control signal to the drive circuit 33.

The head control unit 215 is provided with information for specifying a print start position for each one-way conveyance of the carriage 41 to the return point in the main scanning direction. The head control unit 215 controls the recording head 31 based on the detected position X of the carriage 41 detected by the encoder signal process unit 211 such that the ejection operation of the ink droplets for forming the corresponding image in one pass on the sheet is started from the print start position.

According to the present embodiment, similarly to a known ink jet printer, the carriage 41 reciprocates in the main scanning direction. An image is formed on the sheet by ejecting the ink droplets from the recording head 31 onto the sheet every one-way conveyance of the carriage 41 to the return point. Here, the image in one pass means an image to be formed on the sheet in the one-way conveyance of the carriage 41 to the return point.

The motor control unit 219 calculates an operation amount for the CR motor 51 based on a deviation Vr-V between the detection speed V received from the encoder signal process unit 211 and the target speed Vr, and controls the CR motor 51 through the drive circuit 53 by driving the CR motor 51 with a drive power corresponding to the operation amount. The operation amount may be, for example, a command value of a current or a voltage to be applied to the CR motor 51.

A target speed profile is given to the motor control unit 219. The target speed profile represents the target speed Vr at each time point or each point from the start of the movement of the carriage 41, and includes information on a target stop position corresponding to the return point.

The motor control unit 219 controls the CR motor 51 such that the carriage 41 moves to the target stop position and stops at the target stop position so as to draw a speed trajectory according to the target speed profile by the calculation of the operation amount.

Figure 4:
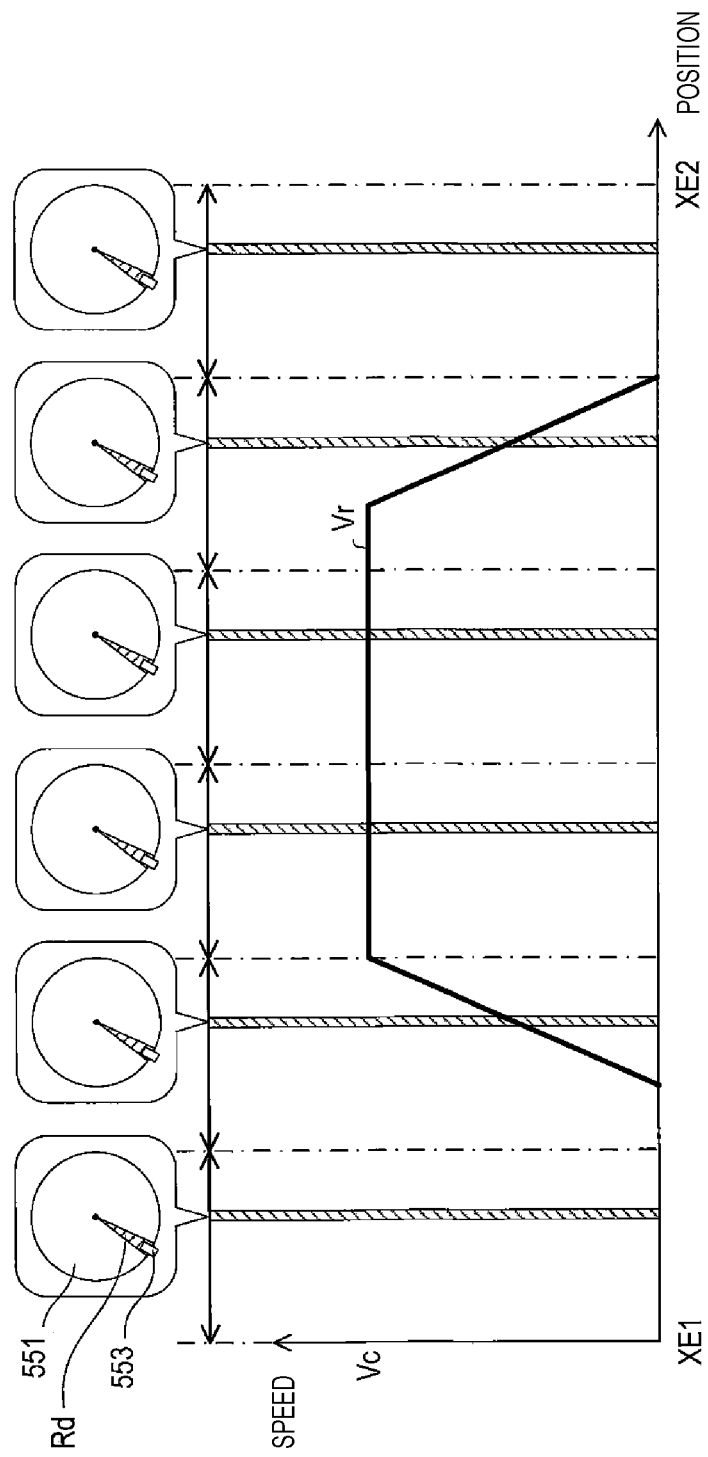
FIG. 4 is a diagram showing a target speed profile and a stained region.

As indicated by a thick solid line in FIG. 4, the target speed profile defines the target speed Vr set in an acceleration section until the carriage 41 reaches a speed Vc from a speed zero, the speed Vc which is the target speed Vr set in a constant speed movement section following the acceleration section, and the target speed Vr set in a deceleration section until the carriage 41 reaches the speed zero from the speed Vc following the constant speed movement section. A graph shown in FIG. 4 is a graph having a horizontal axis of a position and a vertical axis of a speed.

A position XE1 and a position XE2 shown in FIG. 4 represent positions of end points of a movable range of the carriage 41 in the main scanning direction. For example, the position XE2 corresponds to a most downstream position in the forward direction in the movable range of the carriage 41, and the position XE1 corresponds to a most upstream position.

Here, an influence of a detection error of the position X and the speed V caused by the stain of the encoder scale 551 will be described with reference to FIG. 4. The encoder scale 551 may be stained by grease, ink, or the like.

When a part of a rotation angle region of the encoder scale 551 is stained, the sensor 553 may not be able to normally read the scales of the rotation angle region of the encoder scale 551. The detection error of the position X and the speed V may be generated when the encoder scale 551 has such a stained rotation angle region (hereinafter referred to as a "stained region") Rd.

The hatched region shown in FIG. 4 corresponds to the stained region Rd. In the present embodiment, when the carriage 41 moves in the movable range from the position XE1 to the position XE2, the encoder scale 551 rotates a plurality of times. Although the number of rotations of the encoder scale 551 is not limited, the encoder scale 551 rotates six times in the example shown in FIG. 4.

In this case, in each of the acceleration section, the constant speed movement section, and the deceleration section when the carriage 41 moves from a movement start point to the return point, the stained region Rd of the encoder scale 551 can pass through a reading point read by the sensor 553.

When the stained region Rd of the encoder scale 551 passes through the reading point of the sensor 553 according to the movement of the carriage 41, errors may be generated in the position X and the speed V detected by the encoder signal process unit 211.

The encoder signal process unit 211 according to the present embodiment is configured to detect an approximately correct position X to cancel a detection error of the position X caused by a reading error of the scales read by the sensor 553 in the stained region Rd, only in the constant speed movement section in which the carriage 41 moves at a constant speed. Similarly, the encoder signal process unit 211 is configured to detect an approximately correct speed V to cancel a detection error of the speed V caused by a reading error in the constant speed movement section.

The encoder signal process unit 211 can determine the constant speed movement section based on, for example, a target profile. The encoder signal process unit 211 estimates a generation time of the rising edge of the encoder signal generated when it is assumed that the carriage 41 moves at the constant speed Vc according to the target speed Vr in the constant speed movement section, and detects the approximately correct position X by updating the count value of the position to cancel the detection error of the position X caused by the reading error.

Figure 5:
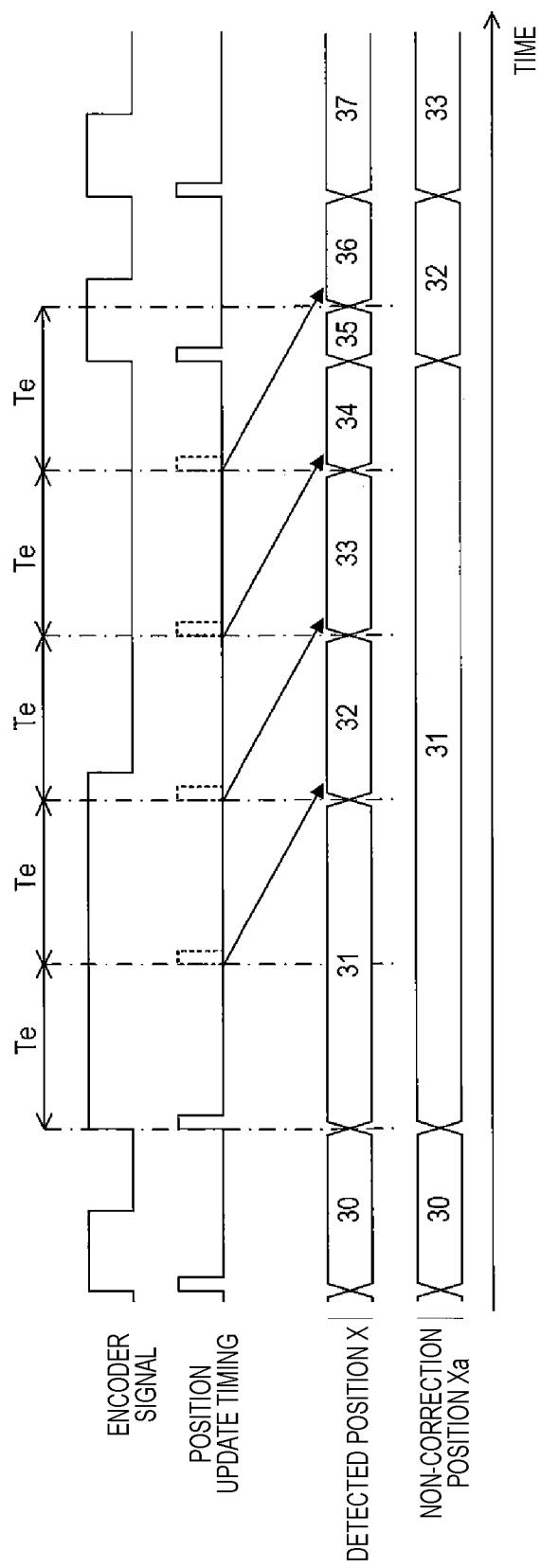
FIG. 5 is a diagram showing an assumed update operation for removing a detection error of a position.

According to the example shown in FIG. 5, a generation cycle of the rising edge of the encoder signal is Te when the carriage 41 moves at a constant speed and at the target speed Vr=Vc. When the encoder signal process unit 211 detects the rising edge of the encoder signal in the constant speed movement section, the encoder signal process unit 211 estimates that the rising edge is generated every time Te from the rising edge. As described above, the count value of the position is updated by the detection of the rising edge. The estimated generation timing of the rising edge corresponds to an update timing of the position X.

The estimated update timing of the position is indicated by a broken line of a graph in the second row of FIG. 5. FIG. 5 shows a waveform of the encoder signal in the first row. In FIG. 5, the horizontal axis represents a time. In the second row, the update timing of the position X is represented by a pulse waveform. The third row shows the position X detected by the encoder signal process unit 211 when the count value is updated. The fourth row shows a non-correction position Xa. The non-correction position Xa indicates a position detected without updating the count value in consideration of a reading error.

When no rising edge is generated at the estimated timing and further no rising edge is generated within an allowable time, the encoder signal process unit 211 assumes that a rising edge is generated after the elapse of the time Te from the estimated timing, and updates the count value. When a rising edge is generated, the count value is updated at this time point. Hereinafter, an update operation of the count value, at which it is assumed that the rising edge is generated, is expressed as an assumed update.

When the encoder signal process unit 211 shifts from a state in which no rising edge is generated at the estimated timing to a state in which a rising edge is detected, the encoder signal process unit 211 estimates that a rising edge is generated every time Te with a newly detected rising edge as a reference, and executes the above-described update operation of the count value.

Accordingly, the encoder signal process unit 211 updates the count value and detects the position X such that the detection error of the position X caused by the reading error in the stained region Rd is not generated in the constant speed movement section. Similarly, in a state in which a rising edge is not generated at the estimated timing, the encoder signal process unit 211 estimates that a rising edge is periodically generated, and detects the speed V. Therefore, the encoder signal process unit 211 detects the speed V such that a detection error of the speed V caused by the reading error in the stained region Rd is not generated.

However, the detection of the position X and the speed V using such periodicity cannot be applied to the acceleration section and the deceleration section. Therefore, the encoder signal process unit 211 executes the assumed update only in the constant speed movement section. The encoder signal process unit 211 does not execute the assumed update in a non-constant speed movement section.

That is, in the non-constant speed movement section other than the constant speed movement section, the encoder signal process unit 211 updates the position X and the speed V based on the fact that a rising edge is actually detected without considering the influence of the reading error even when a rising edge is not generated due to the reading error.

In this case, the detection error of the position X generated in the acceleration section, which is the non-constant speed movement section before the constant speed movement section, remains at the position X detected by the encoder signal process unit 211 even in the constant speed movement section. Therefore, when the recording head 31 is controlled such that the ejection operation of the ink droplets is started at the specified print start position on the assumption that the detected position X is correct, the ejection operation of the ink droplets is started at a position deviated from the original correct print start position.

Similarly, when the CR motor 51 is controlled such that the carriage 41 stops at the specified target stop position on the assumption that the detected position X is correct, the carriage 41 stops at a position deviated from the original correct target stop position. An erroneous stop position affects a printing operation when the next carriage 41 is conveyed from the return point.

Therefore, in the present embodiment, the processor 11 is configured to correct the print start position and the target stop position from a normal position, based on information of the stained region Rd obtained by the control of the CR motor 51 in the constant speed movement section and in consideration of the detection error of the position generated in the non-constant speed movement section. The normal position here means a position to be implemented when there is no detection error.

Figure 6:
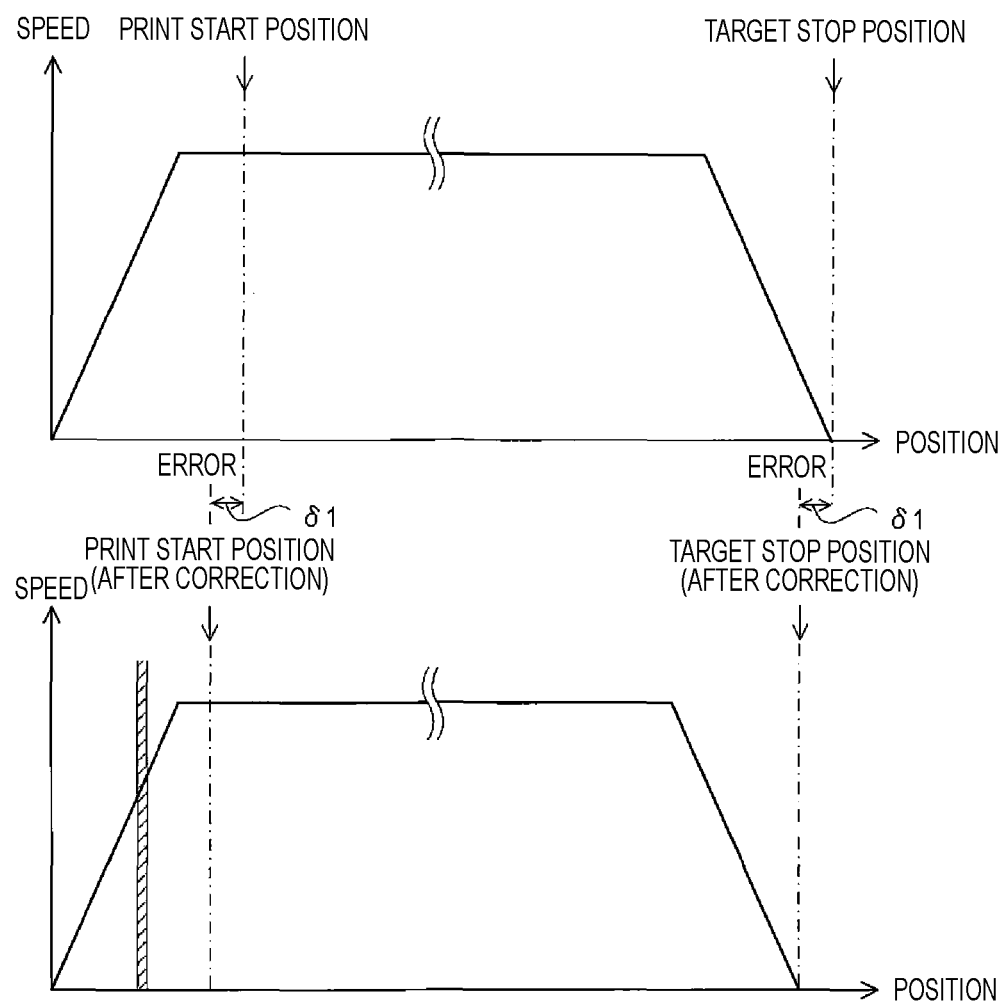
FIG. 6 is an explanatory diagram related to a correction of a print start position and a target stop position.

According to FIG. 6, when the carriage 41 is to pass through the stained region Rd in the acceleration section, in consideration of a detection error $\delta 1$ generated in the stained region Rd, as shown in the lower part of FIG. 6, the processor 11 corrects the print start position to a position deviated by the detection error $\delta 1$ from the normal position where the stained region Rd is not present as shown in the upper part of FIG. 6. This correction is performed before the carriage 41 starts to be conveyed. Similarly, the processor 11 corrects the target stop position to a position deviated by the detection error M from the normal position where the stained region Rd is not present as shown in the upper part of FIG. 6.

According to the present embodiment, the encoder signal process unit 211 detects, in the constant speed movement section, not only the position caused by the assumed update, but also the non-correction position Xa when the assumed update is not executed.

The processor 11 calculates, based on a difference |X−Xa| between the position X detected by the assumed update and the non-correction position Xa which are obtained from the encoder signal process unit 211, a detection error $\delta$ of the position generated in the stained region Rd when the assumed update is not executed in the constant speed movement section, determines the detection error $\delta 1$ generated in the acceleration section based on the detection error $\delta$, and corrects the print start position and the target stop position as described above.

Next, details of the process executed by the processor 11 will be described with reference to FIG. 7 to FIG. 10.

Figure 7:
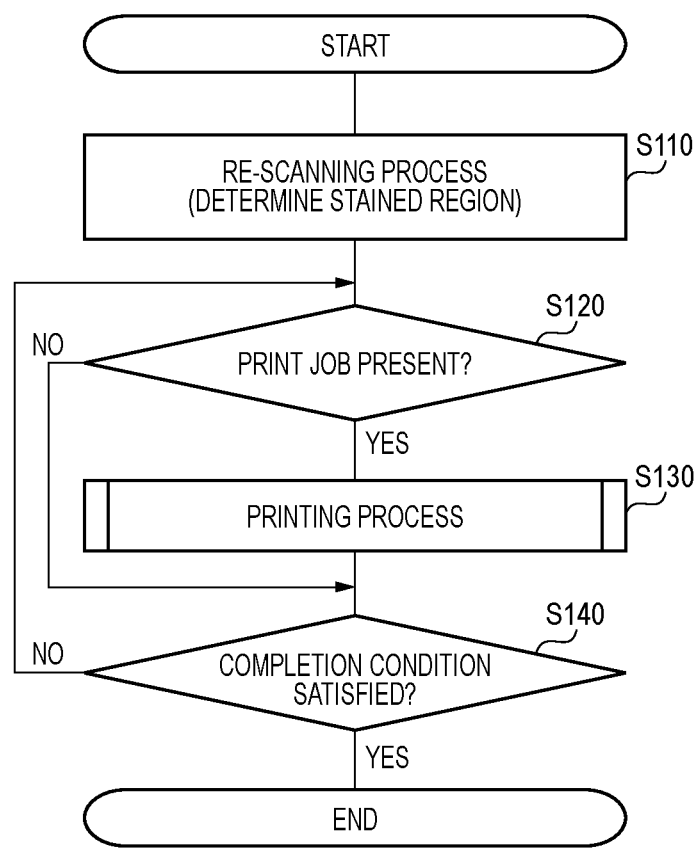
FIG. 7 is a flowchart showing a main process executed by a processor.

In the present embodiment, when the image forming device 1 is activated by power-on or releasing of a sleep mode, the processor 11 starts a main process shown in FIG. 7.

When the main process is started, the processor 11 executes a pre-scanning process (S110). In the pre-scanning process, as initial control before the start of the printing process, the processor 11 moves the carriage 41 at a constant speed without performing the ejection operation of the ink droplets. Based on the initial control, the processor 11 determines the stained region Rd of the rotary encoder 55 and determines the detection error $\delta$.

In the pre-scanning process, the processor 11 can move the carriage 41 to the end point XE1 of the movable range of the carriage 41 corresponding to an origin position of the carriage 41 by controlling the CR motor 51 through the ASIC 20. The count value of the position X can be reset at the end point XE1.

Figure 8:
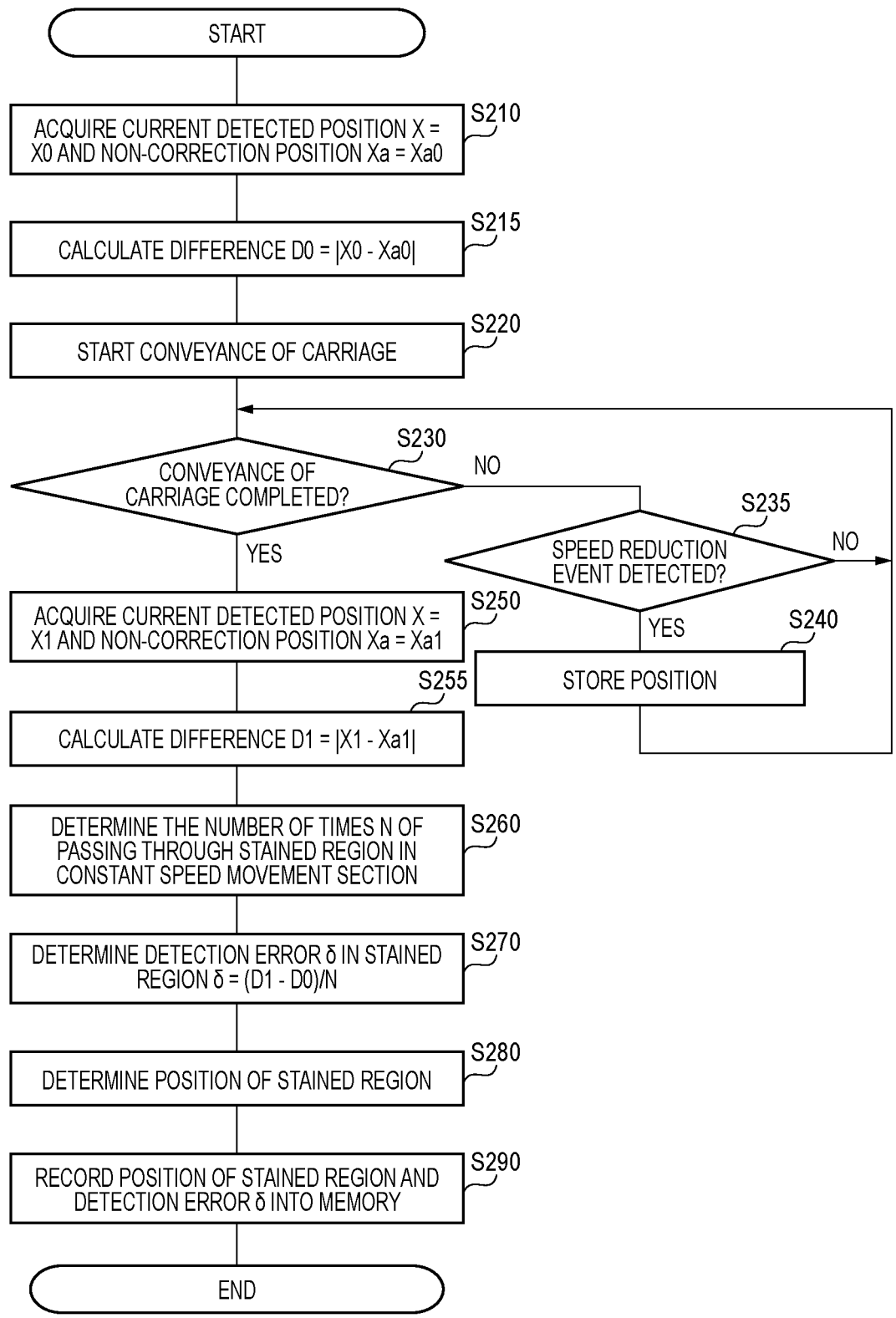
FIG. 8 is a flowchart showing a carriage conveyance-related process executed by the processor.

The processor 11 can further execute a carriage conveyance-related process shown in FIG. 8 in the pre-scanning process. In the carriage conveyance-related process, the processor 11 acquires, from the encoder signal process unit 211, a current detected position X=X0 and the non-correction position Xa=Xa0 of the carriage 41 held by the encoder signal process unit 211 (S210).

Further, the processor 11 calculates a difference D0=|X0−Xa0| between the acquired current detected position X=X0 and the non-correction position Xa=Xa0 (S215). Thereafter, the processor 11 starts conveyance control of the carriage 41 (S220).

In the conveyance control, the processor 11 can control the CR motor 51 through the ASIC 20 to move the carriage 41 to the target stop position according to a predetermined target speed profile.

In the pre-scanning process, the CR motor 51 can be controlled using a preset target speed profile for pre-scanning. The target speed profile includes the constant speed movement section, and the CR motor 51 is controlled such that the carriage 41 moves at a constant speed.

Thereafter, until the conveyance control of the carriage 41 is completed (No in S230), the processor 11 acquires, every time a speed reduction event of the carriage 41 is detected in the constant speed movement section of the carriage 41 (Yes in S235), information of the detected position X at the time of generation of the speed reduction event, and temporarily stores the information (S240).

The encoder signal process unit 211 may be configured to notify, every time the speed of the carriage 41 is reduced by a predetermined amount or more in the constant speed movement section, the processor 11 of the speed reduction event together with the information of the position X at the time of generation of the speed reduction event. The reduction of the speed of the carriage 41 by a predetermined amount or more is generated due to a change in the encoder signal caused by a reading error of the scales in the stained region Rd (that is, no generation of periodic rising edge).

When the conveyance control of the carriage 41 is completed and the carriage 41 stops (Yes in S230), the processor 11 acquires information of the current detected position X=X1 and the non-correction position Xa=Xa1 from the encoder signal process unit 211 (S250).

Thereafter, the processor 11 calculates a difference D1=|X1−Xa1| between the acquired current detected position X=X1 and the non-correction position Xa=Xa1 (S255). Further, the processor 11 determines, based on, for example, the number of times of generation of the speed reduction event, the number of times N of passing through the stained region in the constant speed movement section (S260), and determines the detection error $\delta$ of the position X in the stained region Rd based on an equation $\delta=(D1-D0)/N$ (S270).

In the non-constant speed movement section, since the assumed update is not performed, a value (D1−D0) can be regarded as a difference between the detected position X and the non-correction position Xa caused by the reading error in the stained region Rd generated in the constant speed movement section.

Therefore, by dividing the value (D1−D0) by the number of times N of passing through the stained region in the constant speed movement section, it is possible to determine the detection error δ generated every time the stained region Rd is passed through once in the constant speed movement section when the assumed update is not executed temporarily.

In addition to the determination of the detection error δ, the processor 11 further determines the position of the stained region Rd based on the information of the position X at which the speed reduction event is generated in the constant speed movement section. That is, the processor 11 determines the rotation angle of the encoder scale 551 corresponding to the stained region Rd (S280).

At this time, based on the detection error δ, the processor 11 can determine the position of the stained region Rd in consideration of the detection error of the position X generated in the acceleration section before the carriage 41 moves to the constant speed movement section.

Thereafter, the processor 11 stores the determined position of the stained region Rd and the detection error δ into the RAM 13 which is a memory (S290), and ends the carriage conveyance-related process. Accordingly, the RAM 13 stores information for identifying the position of the stained region Rd and the error generated in the stained region Rd.

After completing the pre-scanning process in S110, the processor 11 determines whether there is an unprocessed print job (S120). A print job is generated when print target data is received from an external device through the communication interface 19. When there is no unprocessed print job (No in S120), the processor 11 executes the process of S140.

Figure 9:
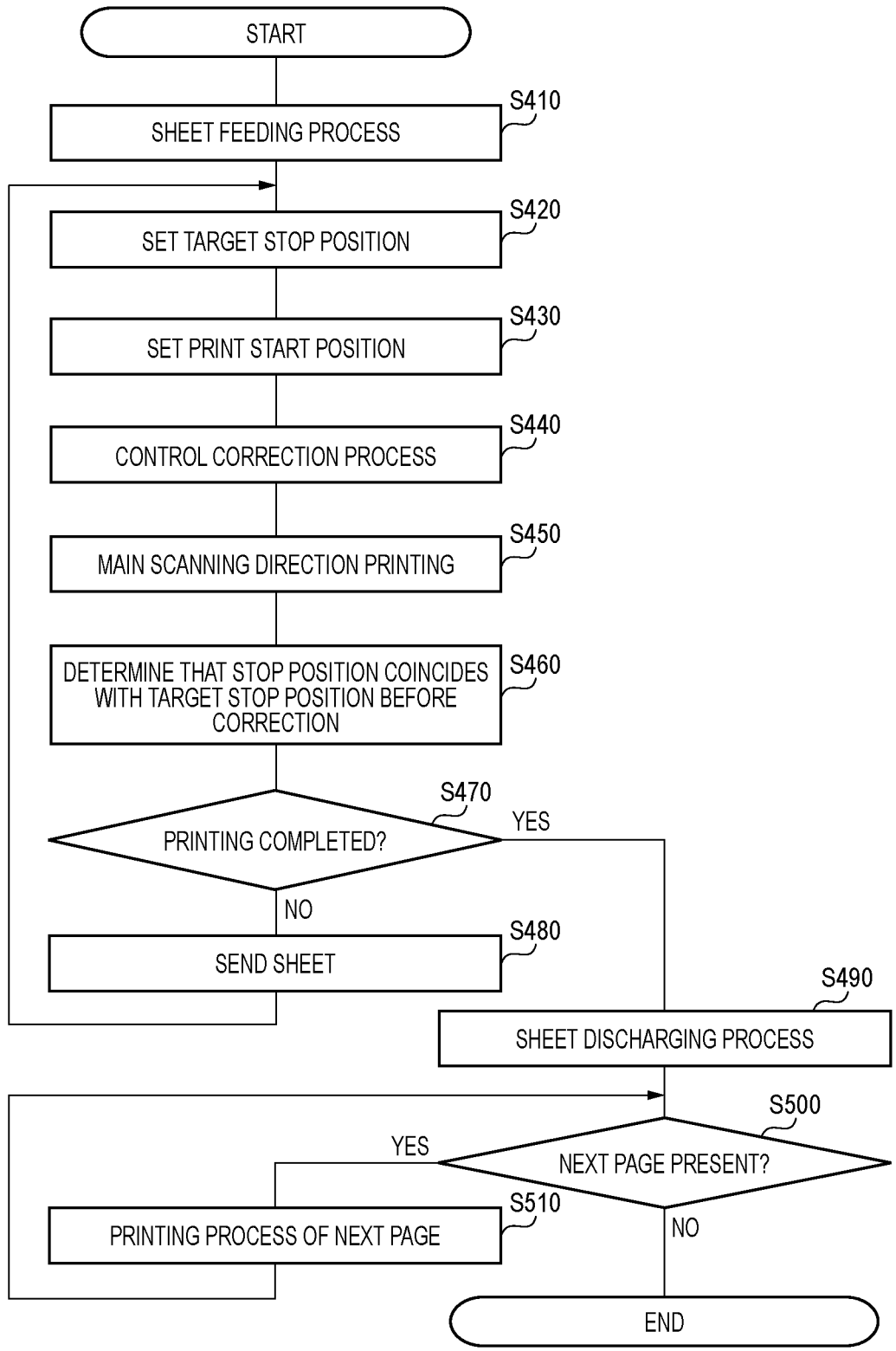
FIG. 9 is a flowchart showing a printing process executed by the processor.

When it is determined that there is an unprocessed print job (Yes in S120), the processor 11 executes the printing process shown in FIG. 9 (S130). By this printing process, an image based on the print target data corresponding to the print job is formed on the sheet. The printed sheet is output to a sheet discharging tray (not shown) of the image forming device 1.

When the printing process is completed, the processor 11 executes the process of S140. In S140, the processor 11 determines whether a completion condition is satisfied. For example, the processor 11 determines that the completion condition is satisfied when a shutdown operation of the power supply is performed or when the power supply shifts to the sleep mode.

When it is determined that the completion condition is not satisfied (No in S140), the processor 11 executes the process of S120. Accordingly, the processor 11 executes the printing process (S130) every time an unprocessed print job is generated until the completion condition is satisfied.

In the printing process, the processor 11 executes a sheet feeding process (S410). In the sheet feeding process, the processor 11 causes the sheet conveyance control unit 25 to control the PF motor 71 such that one sheet is separated from a sheet feeding tray and conveyed in the sub-scanning direction to an ejection position of the ink droplets ejected by the recording head 31.

Thereafter, the processor 11 sets the target stop position when the carriage 41 is conveyed to the return point based on a region of the image to be formed on the sheet based on the print target data (S420), and sets the print start position (S430).

Figure 10:
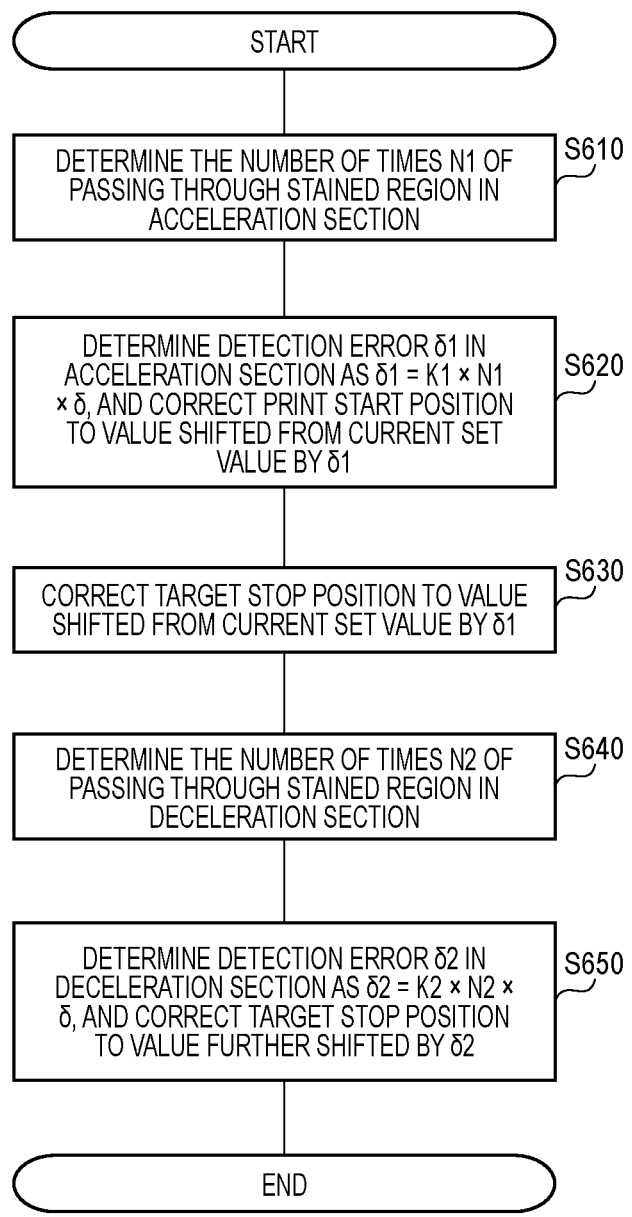
FIG. 10 is a flowchart showing a control correction process executed by the processor.

Further, the processor 11 executes a control correction process shown in FIG. 10 including a process of correcting the target stop position and the print start position in consideration of the detection error δ (S440).

When the control correction process is started, the processor 11 determines the number of times N1 of passing through the stained region in the acceleration section in the target speed profile determined by the setting of the target stop position and the print start position in S420 and S430 (S610). For example, an acceleration section end position is set at a position, which is separated by a predetermined distance from the print start position and is upstream of the carriage 41 in a conveyance direction.

In subsequent S620, the processor 11 determines the detection error δ1=K1× N1× δ of the position X generated in the acceleration section, and corrects the print start position to a value shifted from a current set value by the error δ1.

Specifically, the processor 11 corrects the print start position to a value obtained by subtracting M from the current set value when the carriage 41 is conveyed in the forward direction, and corrects the print start position to a value obtained by adding M to the current set value when the carriage 41 is conveyed in the reverse direction.

The detection error δ used for calculating the error δ1 is the detection error δ (absolute value) determined by the carriage conveyance-related process in advance and stored in the RAM 13 by the process of S290. A coefficient K1 is a conversion coefficient for converting the detection error δ in the constant speed movement section into the detection error in the acceleration section.

That is, in a state in which the assumed update is not executed, it is estimated that, when the detection error δ is generated every time the carriage 41 passes through the stained region Rd in the constant speed movement section, a detection error K1×δ is generated every time the carriage 41 passes through the stained region Rd in the acceleration section. The processor 11 estimates that the detection error δ1=K1×N1×δ is generated in the entire acceleration section, and corrects the print start position to a value shifted from the current set value by K1×N1×δ.

The coefficient K1 may be a value of 1. That is, the coefficient K1 may be omitted. However, the detection error δ is an error observed in the constant speed movement section, and even when the stained region Rd is the same, the detection error K1×δ in the acceleration section may not be the same as the detection error δ in the constant speed movement section due to an influence of a motion state of the carriage 41 or the like. Therefore, in the present embodiment, the detection error K1×δ due to the carriage 41 passing through the stained region Rd in the acceleration section is estimated based on the coefficient K1 calculated by the test, and the print start position is corrected based on the detection error K1×δ.

The processor 11 further corrects the target stop position to a value shifted from the current set value by δ1=K1×N1×δ (S630). δ 1=(K1×N1×δ) is the same as the value in S620. The processor 11 corrects the target stop position to a value obtained by subtracting δ1 from the current set value when the carriage 41 is conveyed in the forward direction, and corrects the target stop position to a value obtained by adding M to the current set value when the carriage 41 is conveyed in the reverse direction.

Further, the processor 11 determines the number of times N2 of passing through the stained region in the deceleration section in the target speed profile (S640). For example, a deceleration section start position is set at a position, which is separated by a distance from the target stop position necessary for deceleration from the speed in the constant speed movement section to the stop and is upstream of the carriage 41 in the conveyance direction.

Thereafter, the processor 11 determines a detection error $\delta2=K2\times N2\times\delta$ of the position X generated in the deceleration section, and corrects the target stop position to a value further shifted by $\delta2$ from a correction value in S630 (S650).

Specifically, the processor 11 corrects the target stop position to a value obtained by subtracting $\delta2$ from the correction value when the carriage 41 is conveyed in the forward direction, and corrects the target stop position to a value obtained by adding $\delta2$ to the correction value when the carriage 41 is conveyed in the reverse direction.

A coefficient K2 is a conversion coefficient for converting the detection error $\delta$ in the constant speed movement section into a detection error estimated in the deceleration section, similarly to the coefficient K1. The coefficient K2 may be a value of 1. That is, the coefficient K2 may be omitted.

Accordingly, when the control correction process in S440 is completed, the processor 11 executes a main scanning direction printing process (S450). In the main scanning direction printing process, the processor 11 controls the movement of the carriage 41 through the print control unit 21 of the ASIC 20 such that the carriage 41 moves at a speed according to a target speed profile determined based on the print start position and the target stop position and stops at the target stop position. Further, the ejection operation performed by the recording head 31 is controlled through the print control unit 21 such that the recording head 31 starts the ejection operation of the ink droplets from the print start position. Accordingly, an image in one pass is formed on the sheet. The print start position and the target stop position are positions corrected by the control correction process.

In the main scanning direction printing process, the processor 11 can also execute the carriage conveyance-related process shown in FIG. 8 to convey the carriage 41 according to the target speed profile, determine the detection error $\delta=(D1-D0)/N$ in the constant speed movement section based on the differences D0 and D1 before and after the carriage 41 is conveyed, and store the position of the stained region Rd and the detection error $\delta$ into the RAM 13.

Accordingly, the processor 11 can update the position of the stained region Rd and the detection error $\delta$ stored in the RAM 13 every time the carriage 41 is conveyed from a return point to the next return point.

In addition, when the main scanning direction printing process is completed and the carriage 41 stops at the target stop position, the processor 11 assumes that the stop position coincides with the target stop position before the correction in S440, that is, the target stop position set in S420, and corrects the detected position X in the encoder signal process unit 211 (S460).

Thereafter, the processor 11 determines whether printing of one page of the sheet is completed (S470). When it is determined that the printing is not completed (No in S470), the processor 11 sends the sheet by a predetermined amount in the sub-scanning direction under the control of the sheet conveyance mechanism 60 by the sheet conveyance control unit 25 of the ASIC 20 (S480).

Thereafter, the processor 11 switches the conveyance direction of the carriage 41 to set the target stop position as the next return point (S420), sets the print start position for forming an image in the next one pass on the sheet (S430), and further executes the process of S440 and thereafter.

Accordingly, the processor 11 repeatedly executes the processes of S420 to S480 while alternately switching the conveyance direction of the carriage 41 between the forward direction and the reverse direction until the printing on one page of the sheet is completed.

When the processor 11 determines that the printing on one page of the sheet is completed (Yes in S470), the processor 11 executes a sheet discharging process related to the printed sheet (S490), and discharges the printed sheet to a sheet discharging tray (not shown) by the control of the PF motor 71 through the ASIC 20.

The processor 11 further determines whether there is a next page (S500). When the print target data covers a plurality of pages, the processor 11 determines that there is a next page, and executes a printing process related to the next page in S510. The process executed in S510 includes the process of feeding the next page and the same processes as S420 to S490. The processor 11 repeatedly executes the process of S510 until the printing process related to all pages is completed. When the printing of all pages is completed (No in S500), the printing process shown in FIG. 9 is completed.

According to the image forming device 1 according to the present embodiment described above, when the stained region Rd is present in the rotary encoder 55, an error is generated in the detected position X in the encoder signal process unit 211 in the non-constant speed movement section.

In the encoder signal process unit 211, a process for removing the detection error $\delta$, which may be generated in the stained region Rd in the constant speed movement section, is executed, and accordingly, the detected position X of the carriage 41 is detected as a position from which the detection error $\delta$ is removed in the constant speed movement section.

Since this removal utilizes the periodicity of the encoder signal in the constant speed movement section, the detection error $\delta$ cannot be removed in the non-constant speed movement section as in the constant speed movement section. Therefore, an error is generated in the position X detected by the encoder signal process unit 211 in the non-constant speed movement section.

In such an environment, the processor 11 of the image forming device 1 determines, based on the information of the position of the stained region Rd and the detection error $\delta$ determined based on the encoder signal in the constant speed movement section stored in the RAM 13, the detection errors $\delta1$ and $\delta2$ of the position X detected by the encoder signal process unit 211 in the non-constant speed movement section (S620 and S650).

The processor 11 corrects the print start position and the target stop position based on the determined detection errors $\delta1$ and $\delta2$ (S620, S630, and S650). Accordingly, the processor 11 corrects ejection control of the ink droplets and the conveyance control of the carriage 41.

Therefore, according to the present embodiment, it is possible to prevent the influence of the position detection error in the non-constant speed movement section caused by the stain of the rotary encoder 55 and to achieve the conveyance control of the carriage 41 and the ejection control of the ink droplets, specifically, the control of the stop position and the print start position with high accuracy.

In particular, in the present embodiment, the position of the stained region Rd and the detection error $\delta$ are determined for each of the pre-scanning process and the one-way conveyance in which the carriage 41 reciprocates. Accordingly, the position of the stained region Rd and the detection error $\delta$ stored in the RAM 13 are updated, and the correction of the print start position and the target stop position is performed based on the latest information of the position of the stained region Rd and the detection error $\delta$.

During the printing process, the print start position and the target stop position are corrected based on the position of the stained region Rd and the detection error δ determined based on the encoder signal during one-way conveyance to the immediately preceding return point. According to the present embodiment, since the information of the stained region Rd is sequentially updated as described above, it is possible to effectively prevent the deterioration of control accuracy caused by the stained region Rd.

According to the present embodiment, the position of the stained region Rd is determined based on the generation position of the speed reduction event caused by the change in the encoder signal in the constant speed movement section. The detection error δ is determined by a change in the difference between the detected position X and the non-correction position Xa. That is, the detection error δ is determined based on the encoder signal in the constant speed movement section.

Therefore, by using the detection error δ in the constant speed movement section as a reference error, the processor 11 determines the detection error K1×δ per stained region passage in the acceleration section by adding a first correction for the acceleration section to the detection error δ, and determines the detection error K2×δ per stained region passage in the deceleration section by adding a second correction for the deceleration section to the detection error δ.

That is, the processor 11 determines the error K1×δ per stained region passage in the acceleration section and the error K2×δ per stained region passage in the deceleration section by applying the coefficients K1 and K2 to the detection error δ. Further, the detection error M in the acceleration section is determined based on the number of times N1 of passing through the stained region in the acceleration section, and the detection error δ2 in the deceleration section is determined based on the number of times N2 of passing through the stained region in the deceleration section.

In the present embodiment, the print start position and the target stop position are corrected based on the detection errors M and δ2 accurately determined for each section. Therefore, it is possible to more effectively prevent the deterioration in the control accuracy due to the detection error of the position.

OTHER EMBODIMENTS

The present disclosure is not limited to the above-described embodiment, and various aspects can be adopted. For example, the technique of the present disclosure can be applied not only to an ink jet printer but also to various electronic devices that control a motion of an object based on an encoder signal from a rotary encoder. For example, the technique of the present disclosure may be applied to a machining device such as a cutting machine in which a machine head other than a recording head is mounted on a carriage.

In addition, the correction of the control in consideration of the detection error δ may be applied only to ejection control of ink droplets, or may be applied only to conveyance control of the carriage 41. For example, only the print start position may be corrected based on the detection error δ1 in the acceleration section, and the target stop position may not be corrected. Only the target stop position may be corrected based on the detection errors δ1 and δ2 in the non-constant speed movement section.

Depending on the position of the return point of the carriage 41, the number of times N1 of passing through the stained region Rd in the acceleration section may be zero. In this case, as a matter of course, the print start position is not corrected, and only the target stop position can be corrected based on the number of times N2 of passing through the stained region Rd in the deceleration section.

A function of one component in the above embodiment may be distributed to a plurality of components. The functions of the plurality of components may be integrated into one component. For example, the controller may not be implemented by the processor 11 and the ASIC 20, may be implemented by one or more processors without an ASIC, may be implemented by one or more ASICs without a processor, or may be implemented by a combination of one or more processors and one or more ASICs. One or more components of the controller including at least one of the processor and the ASIC can cooperate with each other to execute the processes according to the controller of the present disclosure.

In addition, a part of the configuration of the above-described embodiment may be omitted. All aspects included in the technical idea specified from the description in the scope of the claims are embodiments of the present disclosure.

Technical Ideas Disclosed in this Specification

The present specification may be understood to disclose the following technical ideas.

[Item 1]

An electronic device including: a motor; a moving body on which a processing part of processing an object is mounted, the moving body being configured to move in conjunction with rotation of the motor by an action of a force from the motor; a rotary encoder including a scale and a sensor, the rotary encoder being configured to output, as an encoder signal, a read signal of the scale generated by the sensor when the scale rotates relative to the sensor in conjunction with the rotation of the motor; a memory configured to store information capable of identifying a rotation angle of the scale when the sensor is not able to normally read the scale; and a controller configured to control the motor and the processing part based on the encoder signal received from the rotary encoder, in which the controller is configured to execute: a detection process of detecting a position of the moving body based on the encoder signal; a control process including a first control of controlling movement of the moving body by controlling the motor and a second control of controlling a processing operation on the object by the processing part in a constant speed movement section of the moving body, the control process being a process based on the position of the moving body detected by the detection process; a determination process of determining a detection error of the position detected by the detection process generated in an acceleration section of the moving body temporally before the constant speed movement section based on the information stored in the memory; and a correction process of correcting at least one of the first control and the second control based on the detection error determined in the determination process.

[Item 2]

The electronic device according to item 1, in which in the detection process, the rotation angle is detected based on a change in the encoder signal in the constant speed movement section, and information capable of identifying the detected rotation angle is stored into the memory.

[Item 3]

The electronic device according to item 2, in which the first control includes control of reciprocating the moving body by repeatedly executing a process of controlling the motor such that the moving body moves to a target position corresponding to a return point and stops at the target position while alternately switching a moving direction of the moving body between a forward direction and a reverse direction, in the detection process, for each one-way movement to the target position in a process in which the moving body reciprocates, the rotation angle is detected based on a change in the encoder signal in the constant speed movement section during the corresponding one-way movement, and information capable of identifying the detected rotation angle is stored into the memory, and in the determination process, in a process in which the moving body reciprocates, the detection error is determined based on information capable of identifying the rotation angle detected during the one-way movement immediately before the information being stored into the memory.

[Item 4]

The electronic device according to item 2, in which the control process includes initial control of controlling the motor to move the moving body at a constant speed without the processing operation by the processing part before causing the processing part to execute a processing operation on the object, and in the detection process, the rotation angle is detected based on a change in the encoder signal in the constant speed movement section of the moving body during execution of the initial control, and information capable of identifying the detected rotation angle is stored into the memory.

[Item 5]

The electronic device according to any one of items 1 to 4, in which in the determination process, the detection error generated in a non-constant speed movement section of the moving body including the acceleration section is determined, and in the correction process, at least one of the first control and the second control is corrected based on the detection error in the non-constant speed movement section determined by the determination process.

[Item 6]

The electronic device according to item 5, in which the non-constant speed movement section includes the acceleration section in which the moving body accelerates and a deceleration section in which the moving body decelerates, and in the determination process, the detection error of the position generated in the acceleration section and the detection error of the position generated in the deceleration section are determined.

[Item 7]

The electronic device according to item 5 or 6, in which in the detection process, a process of removing the detection error generated at the rotation angle in the constant speed movement section is executed based on the encoder signal, and thus the position of the moving body is detected as a position from which the detection error is removed in the constant speed movement section.

[Item 8]

The electronic device according to any one of items 1 to 7, in which the information capable of identifying the rotation angle includes information capable of identifying, as a reference error, a magnitude of the detection error generated at the rotation angle in the constant speed movement section, and the determination process includes determining the detection error in the acceleration section by adding a predetermined correction to the reference error identified based on the information stored in the memory.

[Item 9]

The electronic device according to item 6, in which the information capable of identifying the rotation angle includes information capable of identifying, as a reference error, a magnitude of the detection error generated at the rotation angle in the constant speed movement section, and in the determination process, the detection error in the acceleration section is determined by adding a first correction to the reference error identified based on the information stored in the memory, and the detection error in the deceleration section is determined by adding a second correction different from the first correction to the reference error.

[Item 10]

The electronic device according to any one of items 1 to 9, in which in the first control, the motor is controlled such that the moving body moves to a target position and stops at the target position, and in the correction process, the first control is corrected by correcting the target position based on the detection error determined in the determination process.

[Item 11]

The electronic device according to any one of items 1 to 10, in which in the second control, the processing operation of the processing part is controlled such that the object is processed from a processing start position in the constant speed movement section, and in the correction process, the second control is corrected by correcting the processing start position based on the detection error determined in the determination process.

[Item 12]

The electronic device according to item 9, in which in the first control, the motor is controlled such that the moving body accelerates to a predetermined speed in the acceleration section, moves at a constant speed and at the predetermined speed in the constant speed movement section following the acceleration section, decelerates in the deceleration section following the constant speed movement section, and stops at a target position, in the second control, the processing operation of the processing part is controlled such that the object is processed from a processing start position in the constant speed movement section, and the correction process includes: correcting the first control by correcting the target position based on the detection errors in the acceleration section and the deceleration section determined in the determination process; and correcting the second control by correcting the processing start position based on the detection error in the acceleration section determined in the determination process.

[Item 13]

An electronic device including: a motor; a moving body on which a processing part of processing an object is mounted, the moving body being configured to move in conjunction with rotation of the motor by an action of a force from the motor; a rotary encoder including a scale and a sensor, the rotary encoder being configured to output, as an encoder signal, a read signal of the scale generated by the sensor when the scale rotates relative to the sensor in conjunction with the rotation of the motor; a memory configured to store information capable of identifying a rotation angle of the scale when the sensor is not able to normally read the scale; and a controller configured to control the motor and the processing part based on the encoder signal received from the rotary encoder, in which the controller is configured to execute: a detection process of detecting a position of the moving body based on the encoder signal; a control process including movement control of controlling movement of the moving body by controlling the motor, the control process being a process based on a position of the moving body detected by the detection process; a determination process of determining a detection error of the position detected by the detection process generated in an acceleration section of the moving body temporally before a constant speed movement section of the moving body based on the information stored in the memory; and a correction process of correcting the movement control based on the detection error determined in the determination process.

[Item 14]

An electronic device including: a motor; a moving body on which a processing part of processing an object is mounted, the moving body being configured to move in conjunction with rotation of the motor by an action of a force from the motor; a rotary encoder including a scale and a sensor, the rotary encoder being configured to output, as an encoder signal, a read signal of the scale generated by the sensor when the scale rotates relative to the sensor in conjunction with the rotation of the motor; a memory configured to store information capable of identifying a rotation angle of the scale when the sensor is not able to normally read the scale; and a controller configured to control the motor and the processing part based on the encoder signal received from the rotary encoder, in which the controller is configured to execute: a detection process of detecting a position of the moving body based on the encoder signal; a control process including processing control of controlling a processing operation on the object by the processing part in a constant speed movement section of the moving body, the control process being a process based on the position of the moving body detected by the detection process; a determination process of determining a detection error of the position detected by the detection process generated in an acceleration section of the moving body temporally before the constant speed movement section based on the information stored in the memory; and a correction process of correcting the processing control based on the detection error determined in the determination process.

What is claimed is:

1. An electronic device comprising:
   a motor;
   a moving body on which a processing part of processing an object is mounted, the moving body being configured to move in conjunction with rotation of the motor by an action of a force from the motor;
   a rotary encoder including a scale and a sensor, the rotary encoder being configured to output, as an encoder signal, a read signal of the scale generated by the sensor when the scale rotates relative to the sensor in conjunction with the rotation of the motor;
   a memory configured to store information capable of identifying a rotation angle of the scale when the sensor is not able to normally read the scale; and
   a controller configured to control the motor and the processing part based on the encoder signal received from the rotary encoder, wherein
   the controller is configured to execute:
      a detection process of detecting a position of the moving body based on the encoder signal;
      a control process including a first control of controlling movement of the moving body by controlling the motor and a second control of controlling a processing operation on the object by the processing part in a constant speed movement section of the moving body, the control process being a process based on the position of the moving body detected by the detection process;
      a determination process of determining a detection error of the position detected by the detection process generated in an acceleration section of the moving body temporally before the constant speed movement section based on the information stored in the memory; and
      a correction process of correcting at least one of the first control and the second control based on the detection error determined in the determination process.

2. The electronic device according to claim 1, wherein in the detection process, the rotation angle is detected based on a change in the encoder signal in the constant speed movement section, and information capable of identifying the detected rotation angle is stored into the memory.

3. The electronic device according to claim 2, wherein the first control includes control of reciprocating the moving body by repeatedly executing a process of controlling the motor such that the moving body moves to a target position corresponding to a return point and stops at the target position while alternately switching a moving direction of the moving body between a one-way movement a forward direction and a one-way movement in a reverse direction,
   in the detection process, for each one-way movement to the target position in a process in which the moving body reciprocates, the rotation angle is detected based on a change in the encoder signal in the constant speed movement section during the corresponding one-way movement, and information capable of identifying the detected rotation angle is stored into the memory, and
   in the determination process, in a process in which the moving body reciprocates, the detection error is determined based on information capable of identifying the rotation angle detected during the one-way movement immediately before the information being stored into the memory.

4. The electronic device according to claim 2, wherein the control process includes initial control of controlling the motor to move the moving body at a constant speed without the processing operation by the processing part before causing the processing part to execute the processing operation on the object, and
   in the detection process, the rotation angle is detected based on a change in the encoder signal in the constant speed movement section of the moving body during execution of the initial control, and information capable of identifying the detected rotation angle is stored into the memory.

5. The electronic device according to claim 1, wherein in the determination process, the detection error generated in a non-constant speed movement section of the moving body including the acceleration section is determined, and
   in the correction process, at least one of the first control and the second control is corrected based on the detection error in the non-constant speed movement section determined by the determination process.

6. The electronic device according to claim 5, wherein
the non-constant speed movement section includes the acceleration section in which the moving body accelerates and a deceleration section in which the moving body decelerates, and
in the determination process, the detection error of the position generated in the acceleration section and the detection error of the position generated in the deceleration section are determined.

7. The electronic device according to claim 5, wherein
in the detection process, a process of removing the detection error generated at the rotation angle in the constant speed movement section is executed based on the encoder signal, and thus the position of the moving body is detected as a position from which the detection error is removed in the constant speed movement section.

8. The electronic device according to claim 1, wherein
the information capable of identifying the rotation angle includes information capable of identifying, as a reference error, a magnitude of the detection error generated at the rotation angle in the constant speed movement section, and
the determination process includes determining the detection error in the acceleration section by adding a predetermined correction to the reference error identified based on the information stored in the memory.

9. The electronic device according to claim 6, wherein
the information capable of identifying the rotation angle includes information capable of identifying, as a reference error, a magnitude of the detection error generated at the rotation angle in the constant speed movement section, and
in the determination process, the detection error in the acceleration section is determined by adding a first correction to the reference error identified based on the information stored in the memory, and the detection error in the deceleration section is determined by adding a second correction different from the first correction to the reference error.

10. The electronic device according to claim 1, wherein
in the first control, the motor is controlled such that the moving body moves to a target position and stops at the target position, and
in the correction process, the first control is corrected by correcting the target position based on the detection error determined in the determination process.

11. The electronic device according to claim 1, wherein
in the second control, the processing operation of the processing part is controlled such that the object is processed from a processing start position in the constant speed movement section, and
in the correction process, the second control is corrected by correcting the processing start position based on the detection error determined in the determination process.

12. The electronic device according to claim 9, wherein
in the first control, the motor is controlled such that the moving body accelerates to a predetermined speed in the acceleration section, moves at a constant speed and at the predetermined speed in the constant speed movement section following the acceleration section, decelerates in the deceleration section following the constant speed movement section, and stops at a target position,
in the second control, the processing operation of the processing part is controlled such that the object is processed from a processing start position in the constant speed movement section, and
the correction process includes:
    correcting the first control by correcting the target position based on the detection errors in the acceleration section and the deceleration section determined in the determination process; and
    correcting the second control by correcting the processing start position based on the detection error in the acceleration section determined in the determination process.

13. An electronic device comprising:
a motor;
a moving body on which a processing part of processing an object is mounted, the moving body being configured to move in conjunction with rotation of the motor by an action of a force from the motor;
a rotary encoder including a scale and a sensor, the rotary encoder being configured to output, as an encoder signal, a read signal of the scale generated by the sensor when the scale rotates relative to the sensor in conjunction with the rotation of the motor;
a memory configured to store information capable of identifying a rotation angle of the scale when the sensor is not able to normally read the scale; and
a controller configured to control the motor and the processing part based on the encoder signal received from the rotary encoder, wherein
the controller is configured to execute:
    a detection process of detecting a position of the moving body based on the encoder signal;
    a control process including movement control of controlling movement of the moving body by controlling the motor, the control process being a process based on a position of the moving body detected by the detection process;
    a determination process of determining a detection error of the position detected by the detection process generated in an acceleration section of the moving body temporally before a constant speed movement section of the moving body based on the information stored in the memory; and
    a correction process of correcting the movement control based on the detection error determined in the determination process.

14. An electronic device comprising:
a motor;
a moving body on which a processing part of processing an object is mounted, the moving body being configured to move in conjunction with rotation of the motor by an action of a force from the motor;
a rotary encoder including a scale and a sensor, the rotary encoder being configured to output, as an encoder signal, a read signal of the scale generated by the sensor when the scale rotates relative to the sensor in conjunction with the rotation of the motor;
a memory configured to store information capable of identifying a rotation angle of the scale when the sensor is not able to normally read the scale; and
a controller configured to control the motor and the processing part based on the encoder signal received from the rotary encoder, wherein
the controller is configured to execute:
    a detection process of detecting a position of the moving body based on the encoder signal;
    a control process including processing control of controlling a processing operation on the object by the processing part in a constant speed movement section of the moving body, the control process being a process based on the position of the moving body detected by the detection process;

a determination process of determining a detection error of the position detected by the detection process generated in an acceleration section of the moving body temporally before the constant speed movement section based on the information stored in the memory; and a correction process of correcting the processing control based on the detection error determined in the determination process.

* * * * *